Jan. 23, 1962 R. D. ENGEL 3,018,360
ARC WELDING TORCH
Filed April 25, 1960
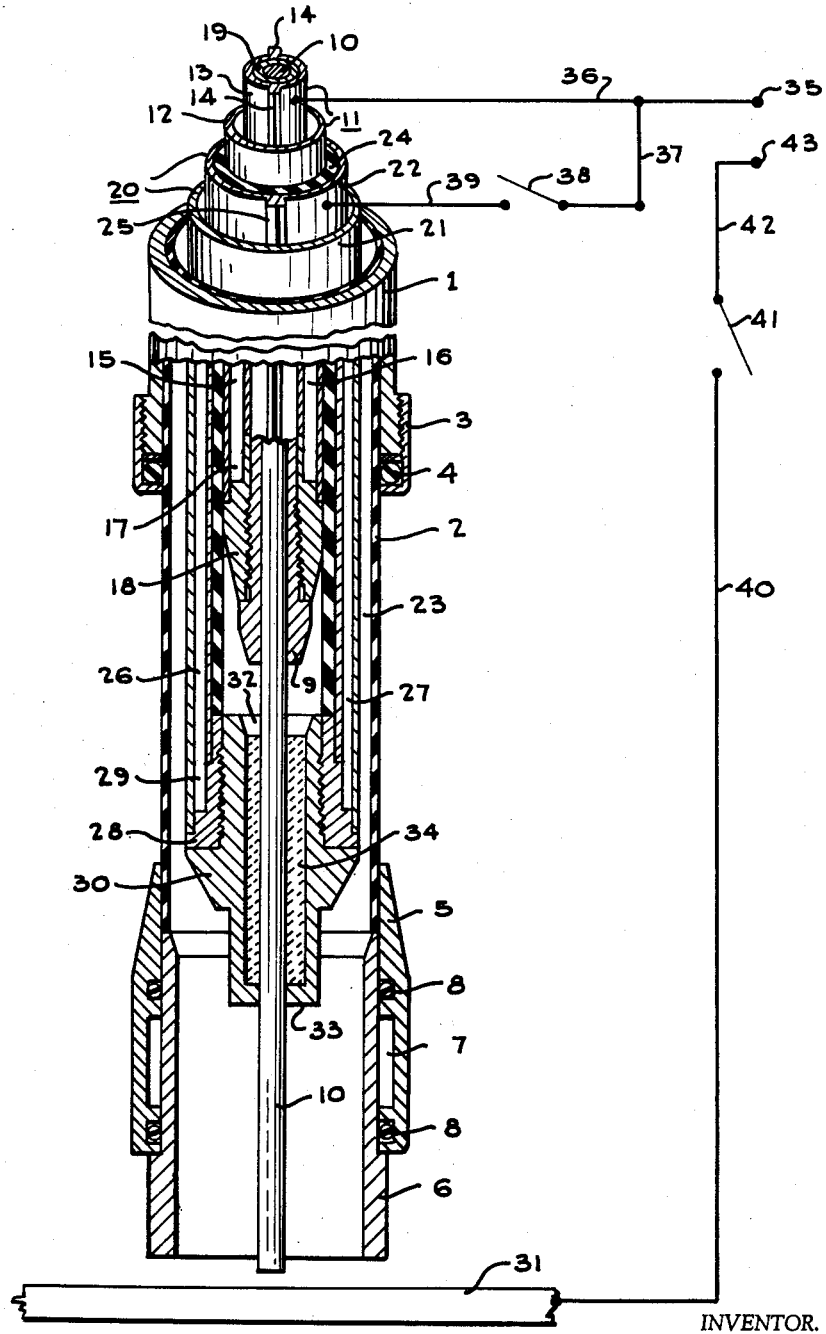
INVENTOR.
RALPH D. ENGEL
BY
*Leslie C. Byer*
ATTORNEY

United States Patent Office 3,018,360
Patented Jan. 23, 1962

3,018,360
ARC WELDING TORCH
Ralph D. Engel, Cranford, N.J., assignor to Air Reduction Company, Incorporated, New York, N.Y., a corporation of New York
Filed Apr. 25, 1960, Ser. No. 24,463
6 Claims. (Cl. 219—130)

This invention relates to an improved arc welding torch particularly suited for use in metal surfacing or overlay work in which an integral layer of metal of one composition is applied to the surface of a base metal of another composition.

In metal surfacing and overlay work the applied metal is obtained by arc fusion of an electrode and the arc welding operation is performed under conditions which increase the melting rate of the electrode and decrease the penetration of the electrode deposited metal in the base metal to which it is applied. This result can be accomplished by performing the arc welding operation with an extended electrode stickout so that the flow of welding current through this stickout produces a desired resistance heating of the electrode before it is subjected to the heat of the welding arc. The expression "electrode stickout" used herein has its well known significance in the art of referring to the portion of the electrode which extends or sticks out beyond the current contact means of the welding torch or other device employed for supplying welding current to the electrode. The resistance heating effect thus obtained in the electrode stickout increases the melting rate of the electrode at the arc and makes it possible to operate under arc welding conditions which reduce the dilution of the surfacing metal by the base metal when the surfacing metal is added thereto by arc fusion of the electrode.

In order to take full advantage of this resistance heating in the electrode stickout, electrode extensions of one or more inches are required and it becomes necessary to guide the electrode after it leaves its current contact means in order to control the cast imparted to the electrode by reason of its storage in the form of a coil from which it is withdrawn during welding. Especially is this true in a gas shielded arc welding operation where the terminal portion of the electrode must be centered in the gas stream supplied through the nozzle of a welding torch in order to secure the desired shielding of the arc. It is necessary to artificially cool this electrode guide to protect it from the heat of the arc and of the workpiece to which said arc is applied. It is also necessary to support the electrode stickout throughout substantially its total length in order to prevent buckling of the electrode between its current contact means and its guide means. The artificially cooled electrode guide consequently extracts heat from the electrode stickout and in part counteracts the desired heating effect obtained in the electrode stickout by its electrical resistance to the flow of welding current therethrough.

When operating with an extended electrode stickout which is suitably positioned in the welding torch by an electrode guide means interposed between the contact means of the torch and the arc supporting terminal of the electrode, it has been found that on initiating a welding operation the electrode either melted or softened between the contact means and the guide means of the torch with the result that the electrode jammed in the guide means or produced an arc in the electrode stickout which fused the electrode and caused it to jam in the guide means. This undesired action always occurs just below the point of current supply to the electrode and can be avoided by moving the point of current pickup to the guide tube when initiating a welding operation. This in effect moves the critical area of the electrode in which the fuse action takes place beyond any restriction in which jamming can occur. Once the arc has been established the point of current pick-up can then be moved back to the contact means normally employed during welding in order to take full advantage of the resistance heating of the electrode obtained from a long electrode stickout. It is thus consequently desirable to provide an electrode guide means which may also serve as a secondary contact means for supplying welding current to the electrode during arc starting and which is electrically insulated from the primary contact means so that during welding the arc current can be supplied solely through the primary contact means when the secondary contct means, provided by the electrode guide is removed from the welding circuit.

It is an object of the invention to provide an electrode stickout guide of improved construction.

It is a further object of the invention to provide a gas shielded arc welding torch embodying an improved electrode stickout guide.

It is also an object of the invention to provide for the electrode stickout of an arc welding torch an artificially cooled guide which is thermally insulated from the resistance heated electrode stickout supported therein except where it passes from the guide and is engaged by a contact means which forms part of said guide and is limited in size to that required for supplying welding current to the electrode at the beginning of a welding operation.

These objects and other objects, together with the advantages of this invention, will be readily understood by persons skilled in the art from the following detailed description of a preferred embodiment thereof.

The accompanying drawing is a sectional view of that portion of a gas shielded arc welding torch in which the electrode stickout guide of this invention has been embodied.

This torch includes an electrode engaging contact member which is connected in the welding circuit for supplying welding current to an electrode fed therethrough. It also embodies an electrically conductive guide means having an electrode passageway therethrough which engages the electrode stickout projecting from the contact member of the torch and holds it in a fixed position in the torch as it travels from said contact member toward a workpiece to be welded. This guide means is electrically insulated from the contact member of the torch and is artificially cooled to protect it from the heat of the arc and of the workpiece to which the arc is applied. The sidewall of the electrode passageway in the guide means is thermally and electrically insulated from the artificially cooled body portion thereof except where the electrode passes from the guide means and is engaged by a contact means which forms part of the guide means and is limited in size to that required for supplying welding current to the electrode at the beginning of a welding operation. This contact means of the guide means is connected in the welding circuit at the start of a welding operation and thereafter disconnected therefrom so that during welding current flows through the electrode stickout and produces the desired resistance heating effect therein while the electrode is passing through the artificially cooled guide which by reason of its construction extracts very little heat therefrom.

The accompanying drawing illustrates that portion of a gas shielded arc welding torch in which the electrode stickout guide of this invention has been embodied. Except for the electrode stickout guide, the torch construction is shown in its entirety in application Serial No. 782,474 of Ralph D. Engel, filed December 23, 1958, entitled "Welding Torch," and on which Patent 2,951,934 issued on September 6, 1960.

As shown in the drawing, the outer barrel of the torch consists of an upper metal tubular section 1 and a lower tubular section 2 which is partly telescoped into section 1 and forms a fluid tight seal therewith through the medium of a clamping ring 3 and an O type sealing ring 4. Section 2 constitutes an adjustable extension of section 1 and clamping ring 3 is internally threaded for engagement with the external threads on the lower end of tubular section 1. Tubular section 2 is made of a suiable material such as fiber.

Secured to the lower end of tubular section 2 is a nozzle holder tube 5. A nozzle 6 is positioned concentrically in tube 5 and abuts the lower end of tubular section 2. Holder tube 5 and nozzle 6 define an annular cooling chamber 7 which is sealed by a pair of O rings 8. Suitable connections, not shown, are provided for circulating cooling water or other fluid through chamber 7.

The contact tube 9 by which welding current is supplied to the electrode 10 forms part of an inner barrel assembly 11 which will now be described. This assembly comprises a pair of concentric metal tubes, namely an outer tube 12 and an inner tube 13. The inner tube has a pair of diametrically opposed fins 14 which divide the space between tubes 12 and 13 into longitudinal cooling passages 15 and 16. Means, not shown, are provided for circulating cooling water or other fluid through these passages and the annular chamber 17 in a holder 18 which extends across the lower extremity of tubes 12 and 13. This serves to cool holder 18 and the electrode contact tube 9 which is threadedly engaged by this holder. Contact tube 9 is adapted to make an electrical contact between electrode 10 and tubes 12 and 13. The inner tube 13 of this inner barrel assembly 11 is provided with a cylindrical liner 19 which is made of suitable electrically insulating material so that the supply of welding current to the electrode 10 takes place at the contact tube 9 at the lower end of the inner barrel assembly.

The electrode guide tube assembly generally indicated by numeral 20 includes an outer metal tube 21 and an inner metal tube 22. These tubes are positioned within the outer barrel 12, and surround the tubes of the inner barrel assembly 11. Tube 21 and the outer barrel define an annular space 23 for the transmission of a shielding gas to the nozzle 6 of the torch. An electrically insulating sleeve 24 is interposed between the inner surface of tube 22 and the outer surface of tube 12 of the inner barrel assembly 11. Tube 22 is provided with a pair of diametrically opposed fins 25 which divide the space between tubes 21 and 22 into the cooling passages 26 and 27 through which water or other cooling fluid is circulated. A tubular fitting 28 is connected to the lower ends of tubes 21 and 22 and defines an annular chamber 29 which connects the cooling passages 26 and 27. An elongated electrode guide tube 30 is threadedly connected to fitting 28 and projects therebelow. This electrode guide tube 30 engages the electrode stickout projecting from the contact member 9 of the torch and holds it in a fixed position in the torch as it travels from the contact member toward the workpiece 31 to which the fused electrode material 10 is to be applied by means of the welding arc.

The electrode guide tube 30 has a socket 32 extending lengthwise thereof from its end adjacent contact tube 9 to a wall structure 33 at its other end through which there is an electrode engaging passageway which is aligned with the electrode passageway in the contact tube. A sleeve of electrically and thermally insulating material 34 is supported in this socket and forms an electrode guiding passageway which is aligned with the passageways in the contact tube 9 and the guide tube 30 by which it is supported.

Welding current may be supplied to the electrode through the guide tube 30 by the contact means thereof formed by the end wall 33 of this guide tube. This welding current is supplied by connecting tubes 21 and 22 of the guide tube assembly in the welding circuit. This welding circuit extends from one terminal 35 through conductors 36, 37, a switch 38 and a conductor 39 which is connected to tubes 21 and 22 of the guide tube assembly. The contact tube assembly 11 is also connected to terminal 35 through conductor 36 for supplying welding current to contact tube 9 which is in engagement with the electrode 10 which is fed through the torch. The welding circuit is completed from electrode 10 to workpiece 31 through a conductor 40, a switch 41 and a conductor 42 to terminal 43. Terminals 35 and 43 are connected to any suitable source of welding current supply.

Thus, at the beginning of a welding operation switches 41 and 38 are closed to complete a welding circuit from terminal 35 through conductors 36 and 37, switch 38, conductor 39, tubes 21 and 22 of the guide tube assembly 20, tubular fitting 28 and guide tube 30 to electrode 10 through the end wall 33 of the guide tube. The workpiece 31 is connected through conductor 40, switch 41 and conductor 42 to terminal 43. The electrode is fed through the torch until it engages the workpiece whereupon the end of the electrode is fused forming an arc. After the arc has been established switch 38 is opened so that welding current is thereafter fed to the electrode through contact member 9 of the inner barrel assembly and the electrode stickout is consequently resistance heated by the flow of welding current therethrough to its arcing terminal. The heat imparted to the electrode by this resistance heating is retained therein due to the sidewall thermal insulation provided by sleeve 34 which engages the electrode stickout for most of its length in its passage through the electrode guide 30. This electrode guide is artificially cooled by the flow of water or other cooling fluid through passages 26, 29 and 27 of the guide tube assembly 20 which directly cools fitting 28, and the guide tube 30 having an extended threaded engagement therewith. This artificial cooling of the guide tube 30 protects it from the heat of the arc and of the metal of the workpiece acted on by the arc. The contact tube 9 is also fluid cooled by a circulation of cooling fluid through passages 15, 17 and 16 forming part of the inner barrel assembly 11. This cooling is directly applied to holder 18 which makes an extended threaded engagement with contact tube 9. The flow of shielding gas through annular passage 23 of the torch also provides some cooling effect on the electrode guide 30 and its support.

By initiating the welding operation by supplying welding current to the electrode through its guide tube 30 there is no possibility of having the electrode jam in the guide tube by reason of its fusing before it reaches the welding arc. Once the arc has been established the current pick-up can then be moved back to the contact means employed during welding in order to take full advantage of the resistance heating of the electrode obtained from a long electrode stickout. During welding this electrode stickout has sufficient column strength to pass through the electrode guide means without jamming therein.

It will be noted that the contact tube 9 and the guide tube 30 are easily replaced in the inner barrel assembly and in the guide tube assembly with which they make detachable connections. Thus, the contact tube and the guide tube may be changed in order to accommodate electrodes of different sizes or to replace them when they become badly damaged by the wear to which they are subjected during welding. Furthermore, guide tubes of various lengths may be substituted for supporting electrode stickouts of various lengths.

The electrode guiding means 30 may be variously modified without departing from the spirit and scope of the invention. Any suitable material may be used for the thermally insulating sleeve 34, such as lava, glass, quartz, ceramic, or the like.

An automatic control may be substituted for the manual control above described for use in starting the welding operation. Such an automatic control is described and claimed in application Serial No. 861,819, of Roger W. Tuthill, filed December 24, 1959, and entitled "Arc Welding." In the control of this Tuthill application the welding operation is initiated by connecting the guide means in the welding circuit and feeding the electrode through its contact means and its guide means into an engagement with the workpiece at a speed less than that required for welding to start a welding arc upon the engagement of the electrode with the workpiece and after a welding arc has been established automatically increasing the electrode feed speed to that required for welding and after the welding speed of the electrode has been established automatically disconnecting the guide means from the welding circuit so that the total supply of current to the electrode is thereafter through the contact means.

Thus, while the present invention has been above described with regard to a single embodiment thereof, it is apparent that it may be variously modified and that other forms of apparatus may be employed to accomplish the desired results above pointed out. Substitute arrangements will occur to those skilled in the art in view of the above description of the invention, and it is, therefore, intended that the appended claims cover all such modifications which fall within the true spirit and scope thereof.

What is claimed is:

1. In arc welding apparatus wherein the resistance heating and arc melting rate of an electrode is increased by increasing a stickout beyond its contact means by which arc welding current is normally supplied thereto, an elongated guide for said electrode stickout, means for fluid cooling the body portion of said guide to protect it from the heat of the welding arc and of the workpiece to which said arc is applied, and a sleeve of thermally and electrically insulating material interposed between the body portion of said fluid cooled guide and the resistance heated electrode stickout in said guide, said sleeve extending lengthwise of said fluid cooled guide except at its discharge end which engages said electrode stickout extending through said guide and constitutes a second contact means for supplying welding current to said electrode.

2. Arc welding apparatus comprising contact means which during welding supplies current to the welding arc through a length of electrode which projects from said contact means and is resistance heated by the current flow therethrough, means for guiding said length of resistance heated electrode in its travel from said contact means toward a workpiece, said guide means having at its entrance end a sleeve of thermally and electrically insulating material which engages most of said length of electrode in said guide means except for a portion thereof at its exit end which is engaged by a contact means forming part of said guide means and limited in size to that required for supplying welding current to the electrode at the beginning of a welding operation, and means for fluid cooling said guide means to protect it from the heat of the arc and of the workpiece to which said arc is applied.

3. Arc welding apparatus comprising means including an electrode engaging contact member for supplying welding current to an electrode fed therethrough, means for connecting said contact member in a welding circuit, an electrically conductive guide means having an electrode passageway therethrough which engages the end of an electrode projecting from said contact member and directs it in its travel from said contact member toward a workpiece to be welded, means for electrically insulating said guide means from said contact member, means for artificially cooling said guide means, means for thermally and electrically insulating said electrode passageway through said guide means except at its discharge end which constitutes a second contact means for supplying welding current to an electrode therein, and means for controlling the connection of said contact means of said guide means in the welding circuit by which current is supplied to said contact member.

4. In a torch for gas shielded arc welding, an upstanding outer barrel; a nozzle secured to the lower end of said outer barrel; an electrically conductive inner barrel assembly at least partly within and spaced from said outer barrel, said inner barrel assembly including an electrically conductive electrode contact tube which terminates above the lower end of said nozzle and forms an electrode engaging passageway through which welding current is supplied to the electrode therein when said inner barrel assembly is connected in a welding circuit; an electrically conductive electrode guide tube assembly within said outer barrel and including an outer tube which is spaced from said outer barrel and defines therewith an annular passage for the transmission of a shielding gas to said nozzle, an inner tube within said outer tube and surrounding said inner barrel assembly, closure means extending across the lower ends of said outer and inner tubes and defining therewith a chamber for a cooling fluid, and an electrode guide tube secured to said closure means, said guide tube being positioned between said contact tube and the lower end of said nozzle and being spaced from said contact tube and said nozzle and said guide tube forming an electrode engaging passageway of uniform dimensions that is aligned with the passageway formed by said contact tube and has a thermally and electrically insulating sidewall structure except for a limited area at its discharge end through which welding current is supplied to the electrode therein when said guide tube assembly is connected in a welding circuit; and means including an electrically nonconductive sleeve intermediate said inner tube and said inner barrel assembly for electrically insulating said guide tube assembly from said inner barrel assembly.

5. In a torch for gas shielded arc welding, an upstanding outer barrel; a nozzle secured to the lower end of said outer barrel; an electrically conductive inner barrel assembly at least partly within and spaced from said outer barrel, said inner barrel assembly including an electrically conductive electrode contact tube which terminates above the lower end of said nozzle and forms an electrode engaging passageway; an electrically conductive electrode guide tube assembly within said outer barrel and including an outer tube which is spaced from said outer barrel and defines therewith an annular passageway for the transmission of shielding gas to said nozzle and which encloses an inner tube which surrounds said inner barrel assembly, closure means extending across the lower ends of said outer and inner tubes and defining therewith a chamber for a cooling fluid, an elongated electrode guide tube secured to said closure means and projecting therebelow, said guide tube being positioned between said contact tube and said nozzle from which it is spaced and said guide tube having a socket extending lengthwise thereof from its end adjacent said contact tube to a wall structure at its other end through which there is a longitudinal electrode engaging passageway which is aligned with the electrode passageway in said contact tube, and a sleeve of electrically and thermally insulating material in and supported by said socket of said guide tube in which it forms an electrode guiding passageway which is aligned with said passageways in said contact tube and said guide tube; and means including an electrically nonconductive sleeve intermediate said inner tube and said inner barrel assembly for electrically insulating said guide tube assembly from said inner barrel assembly.

6. In a torch for gas shielded arc welding, an upstanding outer barrel; a nozzle secured to the lower end of said outer barrel; an electrically conductive inner barrel assembly at least partly within and spaced from said outer barrel, said inner barrel assembly including an electrically conductive electrode contact tube which terminates above the lower end of said nozzle and forms an electrode engaging passageway; an electrically conductive electrode guide tube assembly within said outer barrel and including an outer tube which is spaced from said outer barrel and defines therewith an annular passage for the transmission of shielding gas to said nozzle and which encloses an inner tube which surrounds said inner barrel assembly, said outer and inner tubes defining a first longitudinal passageway for receiving a cooling fluid and a second longitudinal passageway for withdrawing the cooling fluid, a tubular fitting extending across the lower ends of said outer and inner tubes and defining an annular space with said outer tube and said inner tube, said annular space communicating with said first and second passageways, an elongated electrode guide tube secured to said tubular fitting and projecting therebelow, said guide tube being positioned between said contact tube and said nozzle from which it is spaced and said guide tube having a socket extending lengthwise thereof from its end adjacent said contact tube to a wall structure at its other end through which there is an electrode engaging passageway which is aligned with the electrode passageway in said contact tube, and a sleeve of electrically and thermally insulating material in and supported by said socket of said guide tube in which it forms an electrode guiding passageway which is aligned with said passageways in said contact tube and said guide tube; and means including an electrically nonconductive sleeve intermediate said inner tube and said inner barrel assembly for electrically insulating said guide tube assembly from said inner barrel assembly.

References Cited in the file of this patent

UNITED STATES PATENTS

| | | |
|---|---|---|
| 2,721,249 | Landis et al. | Oct. 18, 1955 |
| 2,951,934 | Engel | Sept. 6, 1960 |

UNITED STATES PATENT OFFICE
CERTIFICATE OF CORRECTION

Patent No. 3,018,360 January 23, 1962

Ralph D. Engel

It is hereby certified that error appears in the above numbered patent requiring correction and that the said Letters Patent should read as corrected below.

Column 2, line 15, for "contct" read -- contact --; column 3, line 43, for "12" read -- 1,2 --; column 5, line 32, for "a" read -- its --; same line, for "its" read -- a --.

Signed and sealed this 15th day of May 1962.

(SEAL)
Attest:

ERNEST W. SWIDER
Attesting Officer

DAVID L. LADD
Commissioner of Patents